United States Patent
Nordbeck et al.

(10) Patent No.: US 12,517,813 B2
(45) Date of Patent: Jan. 6, 2026

(54) FINDING FAULTS IN FIRMWARE FOR A LOCK DEVICE

(71) Applicant: ASSA ABLOY AB, Stockholm (SE)

(72) Inventors: Per Nordbeck, Skanör (SE); Mattias Körkkö, Ödåkra (SE)

(73) Assignee: ASSA ABLOY AB, Stockholm (SE)

( * ) Notice: Subject to any disclaimer, the term of this patent is extended or adjusted under 35 U.S.C. 154(b) by 189 days.

(21) Appl. No.: 18/554,482

(22) PCT Filed: Mar. 28, 2022

(86) PCT No.: PCT/EP2022/058108
§ 371 (c)(1),
(2) Date: Oct. 9, 2023

(87) PCT Pub. No.: WO2022/214347
PCT Pub. Date: Oct. 13, 2022

(65) Prior Publication Data
US 2024/0070055 A1   Feb. 29, 2024

(30) Foreign Application Priority Data

Apr. 9, 2021   (SE) .................................. 2150441-0

(51) Int. Cl.
*G06F 11/00*       (2006.01)
*G06F 11/07*       (2006.01)
*G06F 11/3668*     (2025.01)

(52) U.S. Cl.
CPC ...... *G06F 11/3688* (2013.01); *G06F 11/0751* (2013.01); *G06F 11/0736* (2013.01)

(58) Field of Classification Search
CPC ............. G06F 11/3688; G06F 11/0736; G06F 11/0751; G06F 11/3062; G06F 17/40
See application file for complete search history.

(56) References Cited

U.S. PATENT DOCUMENTS 6,477,478 B1   11/2002   Jones et al.
7,085,980 B2 *  8/2006   Martin-de-Nicolas ..................... G06F 11/263
                                                              714/736

(Continued)

FOREIGN PATENT DOCUMENTS

CN   109359674   2/2019
CN   110082622   8/2019

(Continued)

OTHER PUBLICATIONS

"Swedish application No. 2150441-0 Office Action mailed Jan. 7, 2022", 8 pages.

(Continued)

*Primary Examiner* — Alexander Khong
(74) *Attorney, Agent, or Firm* — Schwegman Lundberg & Woessner, P.A.

(57) ABSTRACT

It is provided a method for finding faults in firmware for a lock device. The method is performed by a test device. The method comprises the steps of: receiving data indicating an event that results in operation of the firmware in a test lock device, the test lock device being capable of performing at least some of the functions of the lock device; sampling a plurality of measurements that are indicative of power use by the test lock device over time, wherein the measurements are captured to cover at least part of the operation of the firmware by the test lock device based on the event; and determining that a potential fault occurs in the firmware for the event when the sampled measurements fail to correspond to the event, based on previously recorded data for the same type of event.

13 Claims, 4 Drawing Sheets

(56) References Cited

U.S. PATENT DOCUMENTS

| | | | | |
|---|---|---|---|---|
| 2016/0014131 A1* | 1/2016 | Neafsey | ............... | H04W 12/082 |
| | | | | 713/171 |
| 2016/0179656 A1* | 6/2016 | Yang | .................. | G06F 11/3668 |
| | | | | 717/124 |
| 2017/0152679 A1 | 6/2017 | Almomani et al. | | |
| 2017/0220404 A1* | 8/2017 | Polar Seminario | ......................... | |
| | | | | G06F 11/0751 |
| 2018/0340351 A1 | 11/2018 | Harkonen et al. | | |
| 2020/0210592 A1* | 7/2020 | Karas | .................... | G06F 21/552 |
| 2021/0306201 A1* | 9/2021 | Wang | .................... | H04L 41/064 |

FOREIGN PATENT DOCUMENTS

| | | | | |
|---|---|---|---|---|
| CN | 111751143 | | 10/2020 | |
| CN | 111858295 A | * | 10/2020 | .......... G06F 11/3688 |
| CN | 112102526 | | 12/2020 | |
| EP | 3594875 | | 1/2020 | |
| WO | 2020154957 | | 8/2020 | |
| WO | 2022214347 | | 10/2022 | |

OTHER PUBLICATIONS

"International application PCT EP 2022058108 ISR WO mailed Jul. 21, 2022", 13 pages.

* cited by examiner

FINDING FAULTS IN FIRMWARE FOR A LOCK DEVICE

CROSS-REFERENCE TO RELATED APPLICATION(S)

This application is a national stage application under 35 U.S.C. § 371 of PCT Appl. No. PCT/EP2022/058108, titled "Finding Faults in Firmware for a Lock Device," filed Mar. 28, 2022, which claims priority to Swedish Patent Appl. No. 2150441-0, filed Apr. 9, 2021, each of which is incorporated herein by reference in its entirety.

TECHNICAL FIELD

The present disclosure relates to the field of firmware for lock devices and in particular to finding faults in firmware for lock devices.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

From time to time, the firmware in the electronic lock needs to be updated, e.g. due to adding support for a new type of credential or a new communication protocol. Firmware is software that is installed in eth lock device. Whenever a new firmware is to be installed, as many faults and bugs as possible should be identified. While there are existing test methodologies for testing all types of software, including firmware, these often do not test the firmware while installed. Moreover, existing test methodologies require carefully constructed test conditions and test scripts.

SUMMARY

One object is to allow faults in firmware to be found in a robust and simple manner.

According to a first aspect, it is provided a method for finding faults in firmware for a lock device. The method is performed by a test device. The method comprises the steps of: receiving data indicating an event that results in operation of the firmware in a test lock device, the test lock device being capable of performing at least some of the functions of the lock device; sampling a plurality of measurements that are indicative of power use by the test lock device over time, wherein the measurements are captured to cover at least part of the operation of the firmware by the test lock device based on the event; and determining that a potential fault occurs in the firmware for the event when the sampled measurements fail to correspond to the event, based on previously recorded data for the same type of event.

The step of determining that a potential fault occurs may be based on a machine learning model that is configured to classify an event based on sampled measurements.

The machine learning model may be based on a neural network.

The measurements may be current measurements.

The event may be an event selected from the group consisting of: communicating with a key, unlock, lock, activation of deadbolt, deactivation of deadbolt, ping server, communicate with server, perform Bluetooth communication, and key detection ping.

The test lock device may be powered by a wire-based power interface, while during normal operation, the lock device may be battery powered.

According to a second aspect, it is provided a test device for finding faults in firmware for a lock device. The test device comprises: a processor; and a memory storing instructions that, when executed by the processor, cause the test device to: receive data indicating an event that results in operation of the firmware in a test lock device, the test lock device being capable of performing at least some of the functions of the lock device; sample a plurality of measurements that are indicative of power use by the test lock device over time, wherein the measurements are captured to cover at least part of the operation of the firmware by the test lock device based on the event; and determine that a potential fault occurs in the firmware for the event when the sampled measurements fail to correspond to the event, based on previously recorded data for the same type of event.

The instructions to determine that a potential fault occurs may comprise instructions that, when executed by the processor, cause the test device to determine that a potential fault occurs based on a machine learning model that is configured to classify an event based on sampled measurements.

The machine learning model may be based on a neural network.

The measurements may be current measurements.

The event may be an event selected from the group consisting of: communicating with a key, unlock, lock, activation of deadbolt, deactivation of deadbolt, ping server, communicate with server, perform Bluetooth communication, and key detection ping.

The test lock device may be powered by a wire-based power interface, while during normal operation, the lock device is battery powered.

According to a third aspect, it is provided a computer program for finding faults in firmware for a lock device. The computer program may comprise computer program code which, when executed on a test device causes the test device to: receive data indicating an event that results in operation of the firmware in a test lock device, the test lock device being capable of performing at least some of the functions of the lock device; sample a plurality of measurements that are indicative of power use by the test lock device over time, wherein the measurements are captured to cover at least part of the operation of the firmware by the test lock device based on the event; and determine that a potential fault occurs in the firmware for the event when the sampled measurements fail to correspond to the event, based on previously recorded data for the same type of event.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on fault detection of firmware based on power consumption of a test lock device executing the firmware. This power consumption is measured when an event (e.g. lock, unlock, communication with key, communication with server, etc.) occurs, which causes some processing of the test lock device. Measurements for power consumption (or current, which is indicative of power consumption) are sampled and the test device determines an event based on the sampled measurements and data obtained from previous occurrences of the same event type. If the event determined from the sampled data matches the actual event, the power consumption is as expected and no fault is determined. On the other hand, if there is no match between the determined event and the actual event, this indicates a fault in the firmware, e.g. due to a memory leak or inefficient algorithms. The firmware is then flagged up for further investigation. This way of detecting faults is thus based on capturing measurements and does not need any complicated or carefully developed test protocols. While not all faults will be possible to be detected in this way, quite a few will, and the method is simple and robust, thus providing a solid complement to traditional software testing.

Figure 1:
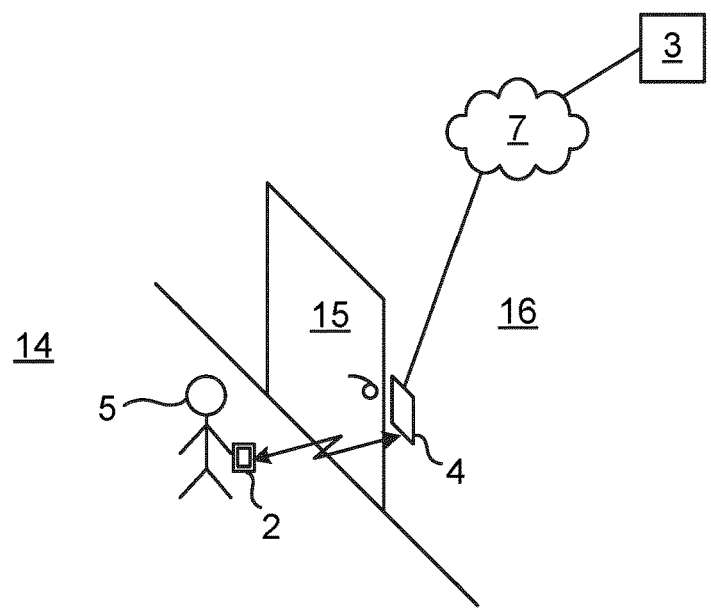
FIG. 1 is a schematic diagram illustrating an environment in which embodiments presented herein can be applied.

FIG. 1 is a schematic diagram illustrating an environment in which embodiments presented herein can be applied. Access to a physical space 16 is restricted by an openable physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. A lock device 12 is provided in order to control access to the physical space 16, by selectively unlocking the barrier 15.

The lock device 4 can be provided in a structure (such as a wall) surrounding the barrier 15 (as shown) or the lock device 4 can be provided in the barrier 15 itself (not shown). The lock device 4 is controllable to be in a locked state or in an unlocked state.

A user 5 carries an electronic key 2. The electronic key 2 can be in any suitable format that allows the lock device 4 to communicate (wirelessly or conductively) with the electronic key 2 to evaluate whether to grant access. For instance, the electronic key 2 can be in the form of a key fob, a key card, a hybrid mechanical/electronic key or embedded in a smartphone, etc. It is to be noted that, while only one electronic key 2 and user 5 are shown in FIG. 1, there can be any suitable number of users with respective electronic keys.

Optionally, the lock device is connected to a network 7, which can be an internet protocol (IP)-based network, to which an optional access control server 3 is connected. The network 7 can e.g. be based on any one or more of a local wireless network, a cellular network, a wired local-area network, a wide-area network (such as the Internet), etc. The access control server 3 optionally assists the lock device 4 in authenticating and/or authorising the electronic key.

From time to time, the firmware in the lock device 4 needs to be updated, e.g. due to upgraded functionality of the lock device 4 and/or bug fixes.

Figure 2:
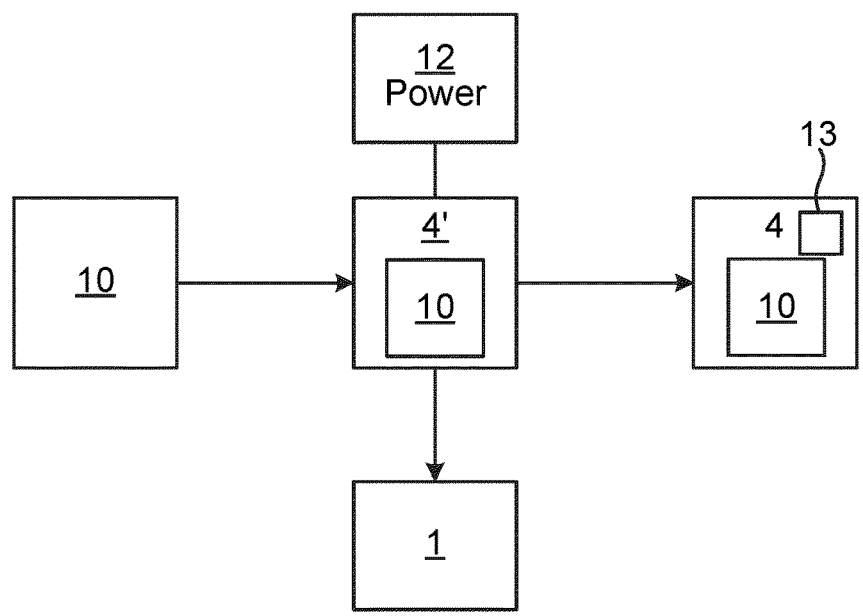
FIG. 2 is a schematic diagram illustrating various entities used for finding faults in firmware according to embodiments presented herein.

FIG. 2 is a schematic diagram illustrating various entities used for finding faults in firmware according to embodiments presented herein.

An instance of firmware 10 has been developed and is to be tested. The firmware is installed in a test lock device 4'. The test lock device 4' is similar to the lock device 4 (shown deployed in FIG. 1), and can perform some or all of the functions of the lock device 4. The test lock device 4' is connected to a power source 12, such as a mains power supply.

A test device 1 samples measurements over time that are indicative of power use by the test lock 4' device. The measurements can e.g. be current measurements or power use measurements, e.g. current measurements indicating the flow of power from the power source 12 to the test lock device 4'. Optionally, the test device 1 forms part of the test lock device 4'. The test lock device 4' can contain all hardware of the lock device 4. The test lock device 4' (or its interface to the power source 12) supports the test device measuring samples of power consumption of the test lock device 4'.

The test lock device 4' is made to operate based on events that occur to the lock device 4 when operation. Some examples of such events are communicating with a key, unlock, lock, activation of deadbolt, deactivation of deadbolt, ping server, communicate with server, perform Bluetooth communication, and key detection ping. The events can be manually triggered and/or triggered by a test program, causing a certain communication event to occur or actuating certain physical movement causing the event to occur.

The test device 1 determines when a fault is likely based on the sampled measurements. When the sampled measurements indicate an event (based on previously measured data for events) that is the same as the event that occurs for the test lock device 4', no fault is detected. However, when the sampled measurements indicate another event than the one that occurs, or no event at all, this is an indication of fault of the firmware 10 installed in the test lock device 4' is faulty, i.e. that there is a bug in the firmware 10. For instance, there can be a memory leak or the firmware can be inefficient etc.

Once the firmware 10 has been tested and approved, it is installed in an operational lock device 4, which can contain its own power supply 13, e.g. in the form of a battery.

Figure 3A:
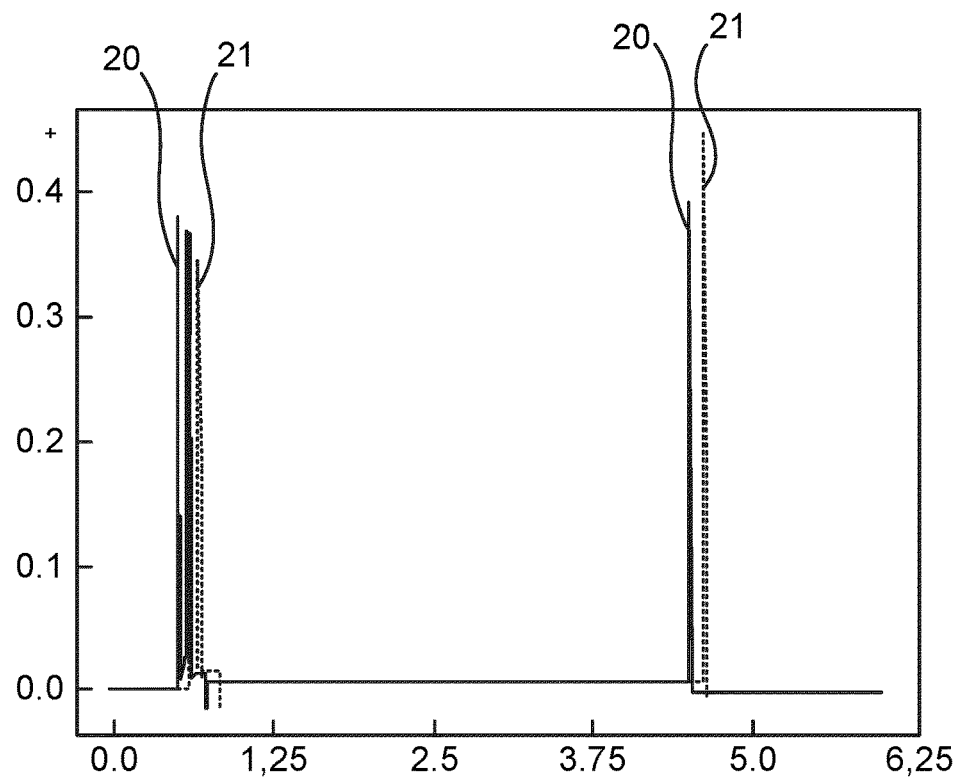
FIGS. 3A-C are diagrams illustrating of examples where measured samples of current of the test lock device are compared with reference values.
Figure 3B:
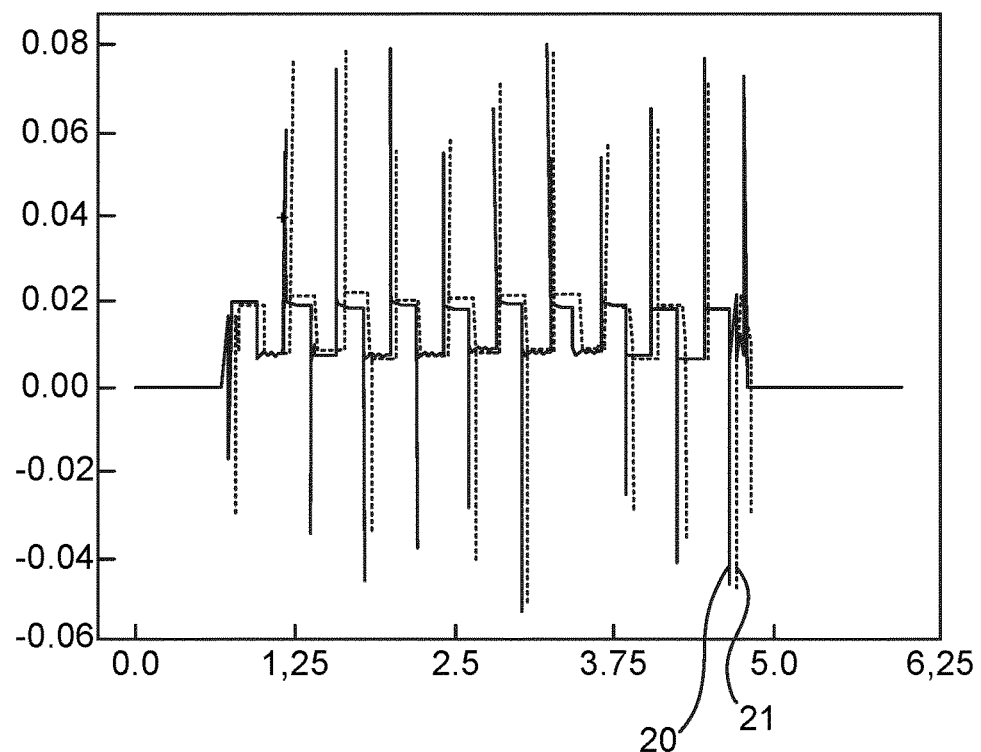
Figure 3C:
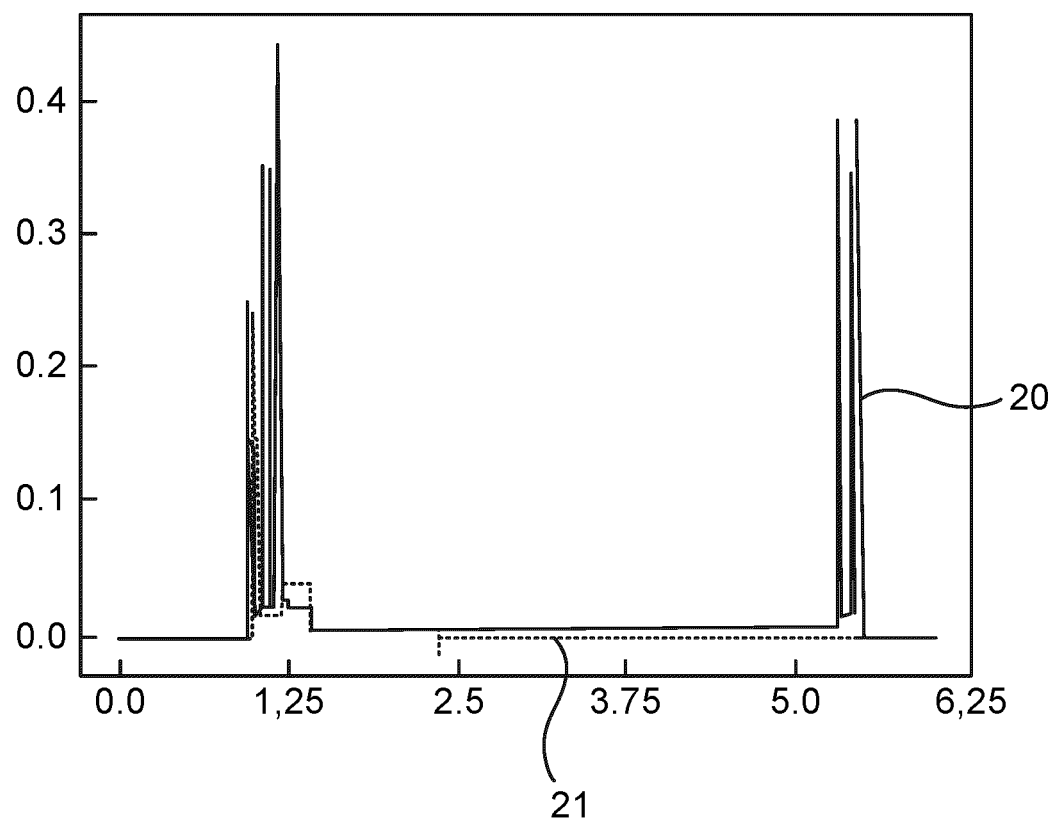

FIGS. 3A-C are diagrams illustrating of examples where measured samples of current of the test lock device compare to reference values. The reference values are previously recorded data for the same type of event. Time flows from left to right, indicated in seconds, and the vertical axis indicates current in mA. The dashed line 21 is based on current samples of the test lock device and the solid line 20 is based on reference values.

In FIG. 3A, it is shown samples 21 and reference values 20 for two events—a lock event (occurring first) and an unlock event (occurring second). In this case, the BLE (Bluetooth Low Energy) is on and Zigbee is off.

In FIG. 3B, it is shown samples 21 and reference values 20 for a longer event, being a BLE wake up.

In both FIG. 3A and FIG. 3B, there is very good correspondence between the samples 21 and the reference values. Hence, no fault is detected using embodiments presented herein when applied in these situations.

In contrast, FIG. 3C illustrates a situation where the samples and the reference values are quite different, indicating that a fault has occurred, which is detected using embodiments presented herein. In this example, a key card is presented to the device, but the lock device does not open due to incorrect reading of the key card.

Figure 4:
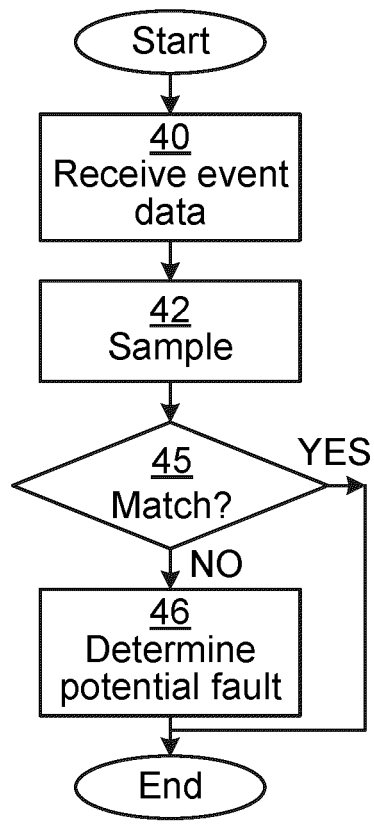
FIG. 4 is a flow chart illustrating embodiments of methods for finding faults in firmware for a lock device, performed in the test device.

FIG. 4 is a flow chart illustrating embodiments of methods for finding faults in firmware for a lock device, performed in the test device 1. In one embodiment, the test lock device 4' is powered by a wire-based power interface, while during normal operation, the lock device 4 is battery powered.

In a receive event data step 40, the test device 1 receives data indicating an event that results in operation of the firmware in the test lock device 4'. The test lock device 4' is capable of performing at least some of the functions of the lock device 4. In one embodiment, the test lock device 4' is capable of performing all of the functions of the lock device 4, to be able to test all possible events that result in operation of the lock device 4. It is to be noted that this step can be performed at any time prior to the conditional match step 45.

The event can be an event selected from the group consisting of: communicating with a key, unlock, lock, activation of deadbolt, deactivation of deadbolt, ping server, communicate with server, perform Bluetooth communication, and key detection ping.

In a sample step 42, the test device 1 samples a plurality of measurements that are indicative of power use by the test lock device 4' over time. The measurements are captured to cover at least part of the operation of the firmware by the test lock device 4' based on the event. The measurements can be current measurements or power consumption measurements or any other suitable measurement being indicative of power consumption by the test lock device 4'. Current measurements are relatively straight-forward to sample, and as long as the voltage is relatively stable, the current measurement is a good indicator of power consumption by the test lock device.

In a conditional match step 45, the test device 1 determines whether the sampled measurements correspond to the event, based on previously recorded data for the same type of event.

This determination can be based on a machine learning model that is configured to classify an event based on sampled measurements. In such a case, the machine learning model can be based on a neural network. The classified event is then determined by the machine learning model based on its previous training data (based on the previously recorded data for the same type of event, in fact for many types of events). The classified event is then compared to the event indicated in the event data received in step 40, to determine whether a match occurs, implying that the samples measurements correspond to the event indicated in the event data received in step 40.

Alternatively, a first curve of the sampled measurements and a second curve of the previously recorded data for the event are aligned (see e.g. FIGS. 3A-C) and a difference between the two curves is calculated, e.g. based on mean squared error (MSE) or any other suitable algorithm for comparing two curves. If the difference is less than a threshold, the two curves are considered to match, implying that the samples measurements correspond to the event indicated in the event data received in step 40.

When the sampled measurements correspond to the event indicated in the event data received in step 40, no fault is identified since there is no deviation in power consumption pattern, and the method ends. On the other hand, when the sampled measurements fail to correspond to the event (i.e. there is no match), the method proceeds to a determine potential fault step 46.

In the determine potential fault step 46, the test device 1 determines that a potential fault occurs in the firmware for the event. This can trigger a manual handling of the exception. This allows someone to inspect the firmware to see if there are any bugs that should be corrected. On the other hand, perhaps the firmware has deliberately been changed in a way that changes the power consumption characteristics, in which case the sampled data can be stored and used as previously recorded data for the event for future iterations of the method.

The method can be repeated for another event type, and/or for more iterations of the same event type.

The sampled measurements indicating power use are not dependent on functional performance of the firmware. This testing can be performed in a simple manner by running the firmware on the test lock device and sampling the measurements.

Figure 5:
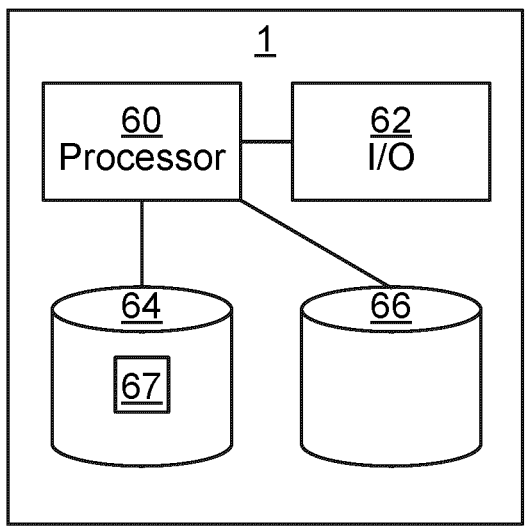
FIG. 5 is a schematic diagram illustrating components of the test device 1 of FIG. 2.

FIG. 5 is a schematic diagram illustrating components of the test device 1 of FIG. 2. It is to be noted that when the authentication device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The test device further comprises an I/O interface 62 for communicating with external and/or internal entities and measuring current consumption (or other measurement indicative of power) by a test lock device.

Other components of the test device 1 are omitted in order not to obscure the concepts presented herein.

Figure 6:
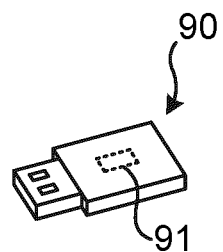
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for finding faults in firmware for a lock device, the method being performed by a test device, the method comprising:
receiving data indicating an event that results in operation of the firmware in a test lock device, the test lock device being capable of performing at least some of the functions of the lock device;
sampling a plurality of measurements that are indicative of power use by the test lock device over time, wherein the measurements are captured to cover at least part of the operation of the firmware by the test lock device based on the event; and
determining that a potential fault occurs in the firmware for the event when the measurements fail to correspond to the event, based on previously recorded data for a same type of event.

2. The method according to claim 1, wherein determining that a potential fault occurs is based on a machine learning model that is configured to classify an event based on sampled measurements.

3. The method according to claim 2, wherein the machine learning model is based on a neural network.

4. The method according to claim 1, wherein the measurements are current measurements.

5. The method according to claim 1, wherein the event is an event selected from the group consisting of: communicating with a key, unlock, lock, activation of deadbolt, deactivation of deadbolt, ping server, communicate with server, perform Bluetooth communication, and key detection ping.

6. The method according to claim 1, wherein the test lock device is powered by a wire-based power interface, while during normal operation, the lock device is battery powered.

7. A test device for finding faults in firmware for a lock device, the test device comprising:
a processor; and
a memory storing instructions that, when executed by the processor, cause the test device to:
receive data indicating an event that results in operation of the firmware in a test lock device, the test lock device being capable of performing at least some of the functions of the lock device;
sample a plurality of measurements that are indicative of power use by the test lock device over time, wherein the measurements are captured to cover at least part of the operation of the firmware by the test lock device based on the event; and
determine that a potential fault occurs in the firmware for the event when the measurements fail to correspond to the event, based on previously recorded data for a same type of event.

8. The test device according to claim 7, wherein the instructions to determine that a potential fault occurs comprise instructions that, when executed by the processor, cause the test device to determine that a potential fault occurs based on a machine learning model that is configured to classify an event based on sampled measurements.

9. The test device according to claim 8, wherein the machine learning model is based on a neural network.

10. The test device according to claim 7, wherein the measurements are current measurements.

11. The test device according to claim 7, wherein the event is an event selected from the group consisting of: communicating with a key, unlock, lock, activation of deadbolt, deactivation of deadbolt, ping server, communicate with server, perform Bluetooth communication, and key detection ping.

12. The test device according to claim 7, wherein the test lock device is powered by a wire-based power interface, while during normal operation, the lock device is battery powered.

13. A non-transitory computer readable storage medium storing a computer program for finding faults in firmware for a lock device, the computer program comprising computer program code which, when executed on a test device, causes the test device to:
receive data indicating an event that results in operation of the firmware in a test lock device, the test lock device being capable of performing at least some of the functions of the lock device;
sample a plurality of measurements that are indicative of power use by the test lock device over time, wherein the measurements are captured to cover at least part of the operation of the firmware by the test lock device based on the event; and
determine that a potential fault occurs in the firmware for the event when the measurements fail to correspond to the event, based on previously recorded data for a same type of event.

* * * * *